Figure 15:
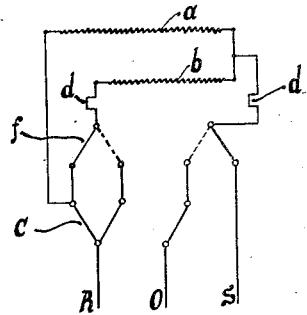

March 8, 1938. O. HEINISCH ET AL 2,110,727
ELECTRICAL HEATING APPARATUS
Filed Aug. 25, 1933 2 Sheets-Sheet 1
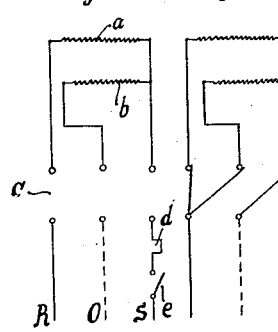
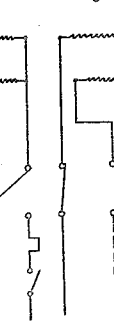
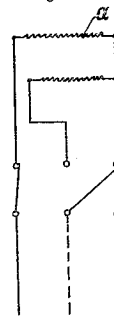
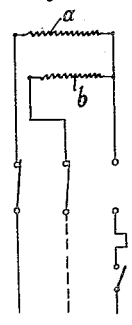
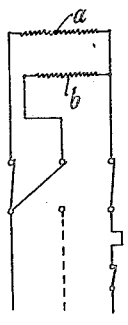
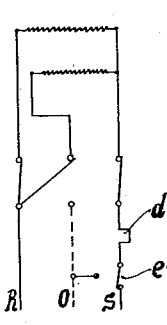
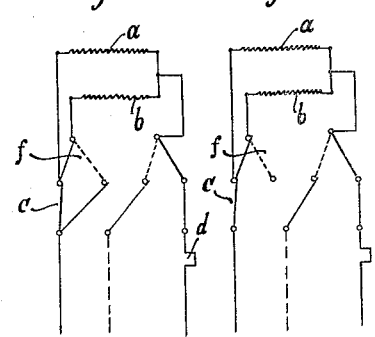
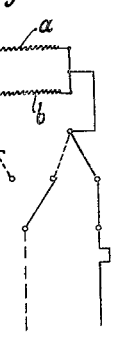
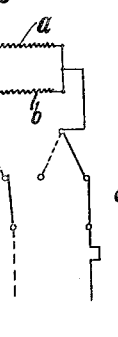
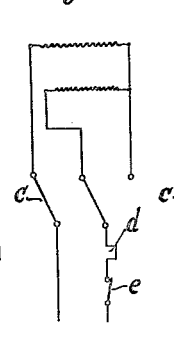
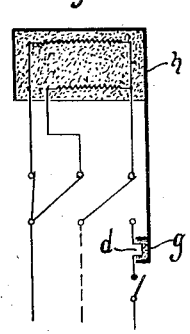
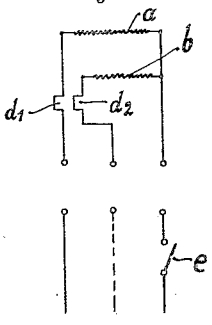
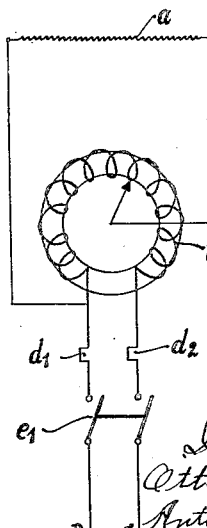

Patented Mar. 8, 1938

2,110,727

UNITED STATES PATENT OFFICE 2,110,727

ELECTRICAL HEATING APPARATUS

Otto Heinisch, Obrighofen, near Wesel, and Anton Riedl, Fluren, near Wesel, Germany Application August 25, 1933, Serial No. 686,684
In Germany March 8, 1933

1 Claim. (Cl. 219—20)

In the usual electrical heating apparatus for boiling, roasting, baking, heating or the like, the heating-up is generally effected by switching-in the heating resistance which passes the heaviest current allowable with continuous working. The heating-up period is consequently relatively prolonged and this is particularly noticeable and disadvantageous in the case of the hot plates of electrical cooking apparatus. According to the invention this disadvantage is obviated by considerably overloading the entire heating resistance for a limited period of time and by automatically eliminating this overloading before the resistance is endangered. The disconnection or alteration of the connections when the desired temperature is reached can be effected by means of a time switch or better by means of a thermostat.

The overloading of the whole resistance can be effected in a simple manner by temporarily employing a higher voltage for the operation of the heating apparatus, in addition to its normal voltage. Thus, for example, during the heating-up period the heating resistances can be connected between the outer conductors of a four-phase system, whereas they are normally connected between one of the phase conductors and the neutral conductor. There may also be produced with the aid of a transformer a voltage which is higher than the normal voltage of the apparatus and the overloading of the heating resistance may then be effected during the heating-up period with this higher voltage, which is preferably automatically disconnected or changed when a predetermined maximum temperature is reached.

It has previously been proposed in the case of a hot plate to short circuit a part of the resistance during the heating-up period so that a correspondingly heavier current flows in the part which remains for conducting the current. In this way a certain increase in the amount of energy which is supplied to the apparatus can be obtained. This is, however, relatively small and moreover is obtained at the expense of nonuniform heating of the plate. Again, this arrangement necessitates plates of special construction being used, namely either plates having a switching device forming part of their construction or plates having additional contacts. By means of the present invention on the other hand plates of normal construction can be used and these are heated uniformly during the period of heating up. Further, by means of the invention, as compared with the known hot plates, with the same strength of current there is a considerable shortening of the heating-up period in the proportion of the overload voltage to the normal voltage and finally the invention only necessitates the arrangement of an additional automatic switch or a suitable alteration to the existing switching device, but no alteration to the heating plate itself.

In order to be able to apply the desired overload to the heating resistance when starting-up the heating or cooking apparatus it may be provided with a separate switch which is first operated when starting-up the apparatus. The normal connections are then made only when the automatic disconnection of the overload switch has taken place. This switch may, however, be combined with the switch which effects the normal connection in such a way that, on operating the switch, the overload is first applied and when the maximum temperature is reached it is automatically changed to the position corresponding to normal operation. Finally, the resistances may also be designed in such a way that they are overloaded in the desired manner when the ordinary operating switch is so adjusted that the heating effect is a maximum. In this case also the period of maximum heating effect must be limited by an automatically acting disconnecting device. The conditions may, however, be chosen in such a way that the strongest heating effect is applied not only during the period necessary to effect the heating-up but also to a limited extent beyond this period.

In the case of a heating apparatus which is able to take continuously an amount of energy which far exceeds the normal requirements, for example in the case of a 22 cm. hot plate which, by reason of its special construction, can be continuously loaded with about 3,000 watts, a sufficiently quick heating-up can be obtained with the highest step of the normal switch, that is to say without overloading the heating resistance. There is then the disadvantage, however, that this apparatus cannot be adjusted in a simple manner for a small consumption which is sufficient for practical use. Thus, for example, a 22 cm. hot plate having a maximum capacity of 3,000 watts is provided only with the three steps, namely 3,000, 1,500 and 750 watts. With the 3,000 watt step heating-up of the plate takes place relatively quickly, but the smallest step of 750 watts is still much too great for continuous operation.

In order in such cases also to be able to regulate within wide limits the consumption of power, which regulation is desired in practical operation, that is to say on the one hand to be able to heat-up the apparatus quickly with a very high consumption of power and on the other hand to be able to continue the heating with a relatively low consumption, i. e. without waste of current, in accordance also with the present invention, several operating voltages of different amounts are used with such heating apparatus. Then on setting the switch to the highest step the heating resistances are connected to the higher voltage and on setting the switch to the lowest step they are connected to the lower voltage. In this case also the alteration in the connections after heating-up can be effected by means of a thermostat.

Thus, for example, if a hot plate with a maximum consumption of 3,000 watts be operated from a four-line three-phase system with 380 volts between the phase conductors and a voltage of 220 volts between a phase conductor and the neutral conductor, then the following steps are possible: 3,000 watts, 1,500 watts, 1,000 watts, 750 watts, 500 watts and 250 watts. In practice some of the intermediate stages will be dispensed with and the apparatus will be adapted for example to the steps 3,000, 1,500, 1,000 and 250 watts. In this case a regulating switch may be used whereby the resistances connected as required have applied to them a voltage of either 380 or 220 volts, or there may be employed a separate pre-switching device which connects the entire apparatus either between the outer conductors or between one outer conductor and the neutral conductor, so that the apparatus can be adjusted to all six steps by means of this switch and a normal regulating switch.

Figure 16:
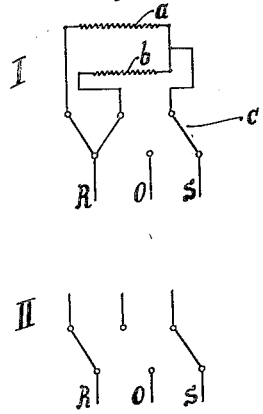
Figure 17:
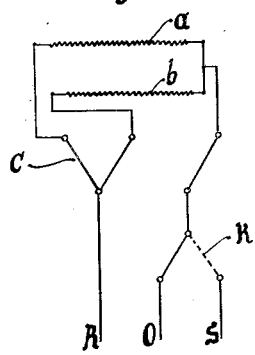

The invention is illustrated by way of example in the accompanying drawings, which show various forms of circuits and switching arrangements. In the drawings:

Figures 1 to 13 show different arrangements for a hot plate, the resistances of which can be connected to two outer conductors, Figure 14 shows a heating apparatus with a regulating transformer, and Figures 15, 16 and 17 illustrate the connections in the case of apparatus which are continuously operated with an artificially reduced voltage.

Referring to the drawings, according to Figure 1 there are two heating resistances $a$, $b$ which can be connected in various ways to the outer conductor R and the middle conductor O, for example to a phase conductor and the neutral conductor of a three-phase system. In accordance with the invention a second outer conductor S is connected to the switch so that this conductor can also be used for the heating-up of the plate. The outer conductor S includes in its circuit a thermostat $d$ and an automatic switch $e$ operated by the thermostat. In Figures 2 to 4 the various usual forms of connection are illustrated. According to Figure 2 the two resistances $a$, $b$ are connected in parallel. This is the position of the maximum normal loading. According to Figure 3 only the resistance $a$ is connected for obtaining a medium consumption. According to Figure 4 the two resistances $a$ and $b$ are connected in series between the outer conductor R and the central conductor O to obtain the minimum loading or consumption which is used, for example, for continuous heating or for keeping the apparatus warm. Figure 5 shows the new connections for the heating-up of the plate. In this figure the two resistances $a$, $b$ are connected in parallel between the two outer conductors R and S. With this form of connection, for example, to a 380/220 voltage system, the load obtainable is three times the maximum load obtainable with the connections shown in Figure 2. The heating-up period is thereby reduced to about a third.

The heating wire can take the increased load without injury if it is disconnected at the proper time. This can be effected by a time switch designed according to the conditions. The apparatus automatically adapts itself to different conditions, in particular to fluctuations in voltage, when there is employed a thermostat $d$ which automatically opens the switch $e$ when the desired temperature is reached. After the automatic disconnection of the outer conductor S, the switch $c$ is set in the desired operating position, for example in one of the positions illustrated in Figures 2 to 4. The switch $c$ for varying the connections of the hot plate may itself be provided also with a contact device for the connection of the second outer conductor.

In Figure 6, instead of the automatic switch $e$ there is provided an automatic change-over switch $e'$ which switches-in the middle conductor O when the outer conductor S is disconnected. Then the maximum normal loading which can be obtained with the connections shown in Figure 2 results.

The arrangement may, however, also be such that any desired connection of the hot plate which is to come into operation after heating-up has occurred can be made before heating-up begins so that, after the disconnection of the second outer conductor, the desired connections for the hot plate resistance suitable to the conditions at the time are made. An example of this arrangement is illustrated in Figures 7 to 9. In these figures there is arranged between the switch $c$ and the heating resistance $a$, $b$ and automatically acting double switch $f$ which is released by a thermostat. The three figures show the three different normal positions and in these figures the full lines show the heating-up position of the switch $f$ and the dotted lines its position for further operation. Figure 7 shows the setting of the switch $c$ for the maximum normal loading corresponding to that of Figure 2. As long as the switch $f$ is in the position indicated in the full lines, the two resistances $a$, $b$ are connected in parallel between the outer conductors R, S. If the switch $f$ is changed over, owing to the action of the thermostat $d$, so that it produces the connections illustrated in dotted lines, then the heating resistances $a$, $b$ are connected in parallel between the outer conductor R and the middle conductor O. The position of the switch $c$ illustrated in Figure 8 corresponds to the setting for medium loading according to Figure 3. When the switch $f$ is set for heating-up the two resistances $a$, $b$ are again connected in parallel between the two outer conductors R, S. After the automatic change over of the switch $f$ only the heating resistance $a$ is connected between the outer conductor R and the middle conductor O. The position of the switch $c$ according to Figure 9 corresponds to the setting for the minimum loading which is indicated in Figure 4. If in this position of the switch $c$ the switch $f$ is set for heating-up, then the two resistances $a$, $b$ are again connected in parallel between the outer conductors. After the automatic changing over of the switch $f$ the resistances $a$, $b$ are connected in series between the outer conductor R and the middle conductor O. The thermostat $d$ can be inserted in the outer conductor S or in the line leading to the point where the two resistances $a$, $b$ are connected, that is to say after the switch. The latter arrangement has the advantage that the thermostat is already preheated like the hot plate, if there is a small load on the apparatus before heating-up takes place.

If there is only one voltage available the resistances may be further subdivided or they may be tapped in order to be able to effect an overloading of the resistances with the voltage available. The voltage for heating-up can also be increased by means of an intermediate transformer. If it is not desired to use either of these means, then the arrangement according to Figures 10 and 11 may be employed, and the resistances so designed that they are overloaded on setting the switch $c$ in accordance with Figure 11. Preferably the resistances are such that, although an overload is produced for effecting a reduction of the heating-up period, its duration need not be too short. In this case also the switch $e$ provided with the thermostat $d$ is automatically disconnected before the hot plate can be damaged.

If the heating-up period from the cold condition of the heating apparatus, for example the hot plate, is to be extended until the maximum limit which is just permissible is reached, that is to say if the disconnection characteristic of the thermostat is to conform exactly to the heating characteristic of the heating resistance, then the thermostat must also be heated even during normal operation according to the power taken by the heating resistance and the heating of the plate produced thereby, although no current yet passes through it. This can be effected by means of the arrangement shown in Figure 12 by metallically connecting the metal casing $g$ of the thermostat $d$ with the metal casing $h$ of the heated apparatus, for example the hot plate, and thereby enabling a transfer of heat to be effected. The thermostat is arranged so that it is insulated within the metallic casing $g$. The thermostat might also be so arranged in such a way that no current whatever flows through it, it being heated solely by the transference of heat.

According to Figure 13, thermostats $d_1$, $d_2$ respectively are connected in series with each of the resistances $a$ and $b$. Both thermostats act on the switch $e$ and the result is thereby obtained that, with each form of connection, current flows through the thermostat by which the disconnection is to be effected.

Figure 14 shows an example in which the heating resistance is connected to a voltage regulator $i$ by which the load on the heating resistance $a$ can be regulated. In this case also there are provided two thermostats $d_1$ and $d_2$ and an automatically operating switch $e_1$ which in this case is a double pole switch since it connects two outer conductors R, S. The disconnection characteristic of the thermostat must conform to the heating-up characteristic of the heating resistance. Owing to the fact that the voltage regulator $i$ is connected after the automatic switch, the voltage regulator does not need to be designed to have a capacity in continuous operation which corresponds to the maximum loading which occurs during heating-up. A voltage regulator having a smaller capacity is sufficient if care be taken that its heating-up characteristic lies within the protective range of the thermostat. With this form of connection the heating resistance may be designed to be very powerful since only one resistance is necessary and not two different resistances as in the usual forms of construction, such as are illustrated in the other figures. Nevertheless, any desired alteration in the consumption of energy is possible up to the maximum loading. Preferably with this arrangement the normal voltage of the hot plate is less than the mains voltage in order that, as thick resistance wires as possible may be used.

Figures 15 to 17 relate to a cooking apparatus in which the maximum setting by means of the normal regulating switch produces so great a supply of energy that the heating-up time is very short and consequently a voltage is employed for continuous operation which is less than the normal voltage of the apparatus, in order to avoid waste of current.

In the example according to Figure 15 the switching arrangement of Figure 7 is employed in which a separate double pole switch $f$ is arranged between the usual switch $c$ and the heating resistances $a$, $b$. The double pole switch $f$ can be moved into the position illustrated in dotted lines by means of the thermostat $d$. In this case the voltage between R and S corresponds to the normal voltage of the heating apparatus, for example the hot plate. Therefore, after heating-up has taken place, a setting to the smaller voltage existing between R and O takes place because otherwise the current strength would be unnecessarily great during continuous operation, for example during further cooking.

In the apparatus according to Figure 16 all connections are made by hand by means of the switch $c$. In the position I the two resistances $a$ and $b$ which are of equal size are connected in parallel between the outer conductors R and S. The consumption of watts is then a maximum, for example 3,000 watts. In the position II only the resistance $a$ is connected between the outer conductors and consequently the consumption of watts is 1,500. In the position III the two resistances are connected in parallel between the phase conductor R and the neutral conductor. The consumption of watts is then about 1,000 watts. In the position IV both resistances are connected in series between the outer conductors and the consumption is then about 750 watts. In the position V only the resistance $a$ is connected between the outer conductor R and the neutral conductor, and then the consumption is 500 watts. Finally, in the position VI the resistances are connected in series between the outer conductor R and the neutral conductor O, and the consumption is then 250 watts. In practice the four positions for consumptions of 3,000, 1,500, 1,000 and 250 watts are sufficient.

Finally, Figure 17 shows an arrangement in which a switch $k$ is interposed in front of the switch $c$. By means of this switch $k$ the entire apparatus is connected either between the outer conductors R and S or between the outer conductor R and the neutral conductor O. In this case also an automatic changing over may be effected by means of a thermostat, time switch or the like. With all the forms of connection, owing to the use of two voltages of different sizes, the result is obtained that on the one hand a quick heating-up is effected by means of the highest step, while on the other hand the lower consumption desired for continuous working can be provided for, so that wastage of current does not take place.

What we do claim as our invention and desire to secure by Letters Patent is:

A heating device comprising heating elements, leads including high and low voltage leads and a common lead, a thermostatically controlled change-over switch to connect said elements to said high voltage lead in a cold condition and to disconnect said elements from said high voltage lead and to connect the same to said low voltage lead in response to the heating effect of the current in the high voltage lead, said thermostatically controlled switch being removed from said elements and operating independently of the temperature of the elements to change-over the connection before the high voltage current can injure the elements, and a manual selector means cooperating with said thermostatically controlled switch for connecting said elements in series or in parallel with said low voltage lead and said common lead in one position and in parallel with the high voltage and common leads in another position, said high voltage being above the safe working voltage of said heating elements and said high voltage connection serving to heat up said elements rapidly.

OTTO HEINISCH.
ANTON RIEDL.